US012596880B2

(12) United States Patent
Feng et al.

(10) Patent No.: US 12,596,880 B2
(45) Date of Patent: Apr. 7, 2026

(54) DETERMINING CAUSALITY BETWEEN FACTORS FOR TARGET OBJECT BY ANALYZING TEXT

(71) Applicant: NEC CORPORATION, Tokyo (JP)

(72) Inventors: Lu Feng, Beijing (CN); Adi Lin, Beijing (CN)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 18/365,535

(22) Filed: Aug. 4, 2023

(65) Prior Publication Data

US 2024/0046042 A1 Feb. 8, 2024

(30) Foreign Application Priority Data

Aug. 5, 2022 (CN) .......................... 202210940329.0

(51) Int. Cl.
*G06F 40/279* (2020.01)
*G06F 40/30* (2020.01)
*G06Q 30/0203* (2023.01)

(52) U.S. Cl.
CPC ............ *G06F 40/30* (2020.01); *G06F 40/279* (2020.01)

(58) Field of Classification Search
CPC .... G06F 40/279; G06F 40/284; G06F 40/289; G06F 40/295; G06F 40/30; G06F 40/35; G06Q 30/0282; G06Q 30/0203
USPC ............ 704/1, 9; 705/7.32, 7.37; 706/46, 55
See application file for complete search history.

(56) References Cited

U.S. PATENT DOCUMENTS

| | | | | |
|---|---|---|---|---|
| 10,366,362 B1 * | 7/2019 | Reddy | .................. | G06Q 10/067 |
| 10,410,224 B1 * | 9/2019 | Levanon | ................ | G06Q 30/02 |
| 10,643,355 B1 * | 5/2020 | Osofsky | ................ | G06F 40/284 |
| 10,755,294 B1 * | 8/2020 | Podgorny | .......... | G06Q 30/0203 |
| 11,107,096 B1 * | 8/2021 | Singh | ........................ | G06F 40/30 |
| 11,922,129 B2 * | 3/2024 | Bhandari | ................ | G06F 40/30 |
| 11,960,839 B2 * | 4/2024 | Minami | .................. | G06F 40/30 |

(Continued)

FOREIGN PATENT DOCUMENTS

| | | | | | |
|---|---|---|---|---|---|
| CA | 2636728 A1 * | 12/2009 | | ............. | G06Q 30/02 |
| JP | 11-250085 A | 9/1999 | | | |
| WO | WO-2014138744 A1 * | 9/2014 | | ............. | G06F 16/33 |

OTHER PUBLICATIONS

"AI-Powered Text Analytics for Everyone", Medallia, 2023 (6 pages total) Accessed via the Internet: https://www.medallia.com/platform/text-analytics/.

(Continued)

*Primary Examiner* — Martin Lerner
(74) *Attorney, Agent, or Firm* — Sughrue Mion, PLLC

(57) ABSTRACT

According to the embodiments of the present disclosure, method and device for information processing are provided. This method comprises determining a group of target factors for a target object based on an unstructured text set about the target object. Each target factor represents an aspect of the target object. This method also comprises determining a causal-outcome event pair comprising a causal event and outcome event by analyzing the text in the text set. This method further comprises determining, based on the causal-outcome event pair, a first causality between a first factor in the group of target factors and a second factor of the target object. This scheme helps to improve the mining of causalities among the target object, thereby facilitating the improvement of the target object.

16 Claims, 8 Drawing Sheets

(56)                    References Cited

U.S. PATENT DOCUMENTS

| | | | | |
|---|---|---|---|---|
| 2009/0028164 | A1* | 1/2009 | Hirsch | G06F 40/30 |
| | | | | 370/254 |
| 2016/0203500 | A1* | 7/2016 | Williams | G06F 16/33 |
| | | | | 705/7.32 |
| 2020/0357009 | A1* | 11/2020 | Podgorny | G06Q 30/0203 |
| 2020/0401910 | A1* | 12/2020 | Hassanzadeh | G06F 40/30 |
| 2021/0142343 | A1* | 5/2021 | Gardner | G06F 40/20 |
| 2022/0405487 | A1* | 12/2022 | Bhandari | G06N 20/00 |
| 2024/0028836 | A1* | 1/2024 | Lin | G06F 40/279 |

OTHER PUBLICATIONS

"Mine customer voices in survey responses. Find deeper conclusions.", MonkeyLearn—Survey Analysis, 2023 (5 pages total) Accessed via the Internet: https://monkeylearn.com/application/survey-analysis.
Communication dated Jul. 30, 2024 issued by the Japanese Patent Office in application No. 2023-125813.
Takuo Hirayama, et al., "Generating Graphs of Tendencies and Factors from Product Reviews", DEIM Forum, 2012, C3-5, 8 pages total.
Yamada, et al., "Classification of Causality between Two Sentences Based on Automatically Constructed Casual Knowledge", Proceedings of the 27th Annual Conference of the Association for Natural Language Processing, Mar. 2021, pp. 1644-1648 (6 pages total).

* cited by examiner

300

EXTRACT A PLURALITY OF KEYWORDS FROM AN UNSTRUCTURED
TEXT SET FOR A TARGET OBJECT
310

GROUP AT LEAST A PORTION OF THE PLURALITY OF KEYWORDS
BASED ON  SEMANTICS OF THE PLURALITY OF KEYWORDS
320

DETERMINE A TARGET FACTOR CORRESPONDING TO A GROUP OF
KEYWORDS BASED ON A RESULT OF THE GROUPING
330

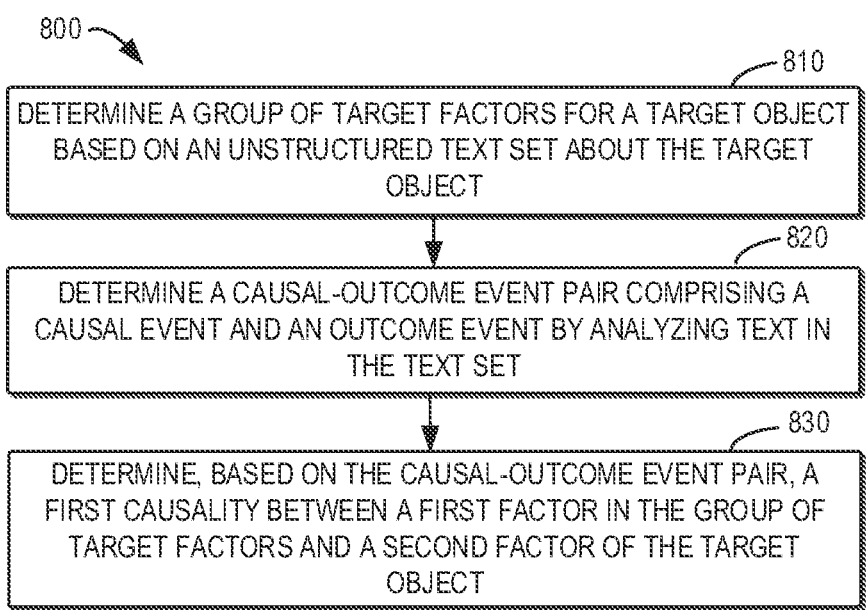

800

810

DETERMINE A GROUP OF TARGET FACTORS FOR A TARGET OBJECT BASED ON AN UNSTRUCTURED TEXT SET ABOUT THE TARGET OBJECT

820

DETERMINE A CAUSAL-OUTCOME EVENT PAIR COMPRISING A CAUSAL EVENT AND AN OUTCOME EVENT BY ANALYZING TEXT IN THE TEXT SET

830

DETERMINE, BASED ON THE CAUSAL-OUTCOME EVENT PAIR, A FIRST CAUSALITY BETWEEN A FIRST FACTOR IN THE GROUP OF TARGET FACTORS AND A SECOND FACTOR OF THE TARGET OBJECT

FIG. 8

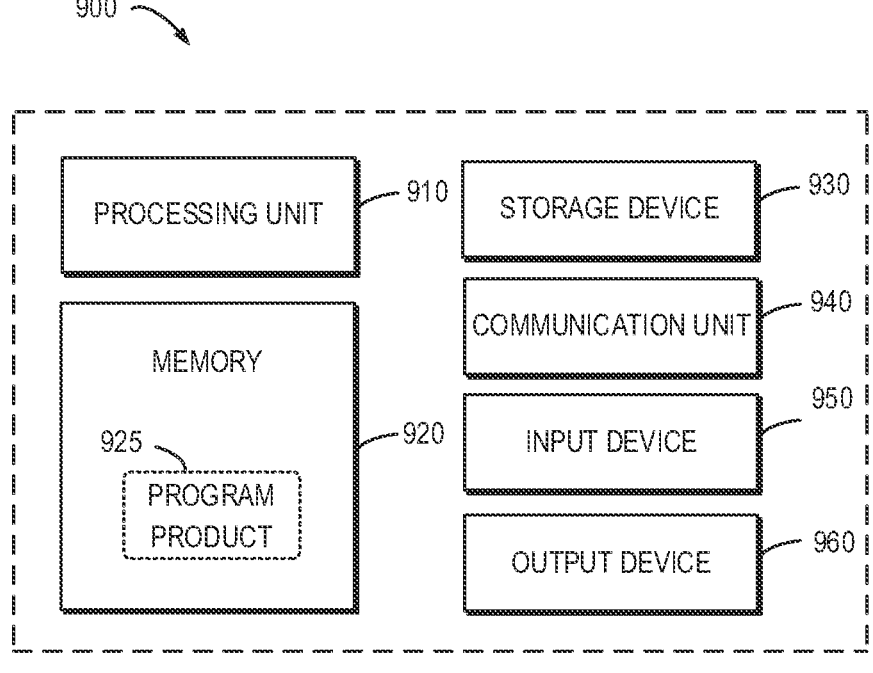

900

PROCESSING UNIT — 910

STORAGE DEVICE — 930

COMMUNICATION UNIT — 940

MEMORY

925

PROGRAM PRODUCT

920

INPUT DEVICE — 950

OUTPUT DEVICE — 960

DETERMINING CAUSALITY BETWEEN FACTORS FOR TARGET OBJECT BY ANALYZING TEXT

CROSS-REFERENCE TO RELATED APPLICATION(S)

This application claims priority to and benefits of Chinese Patent Application No. 202210940329.0, filed on Aug. 5, 2022, and entitled "Method and device for information processing", the entire disclosure of which is hereby incorporated by reference.

TECHNOLOGY FILED

The example embodiments in the present disclosure generally relate to the field of computers, particularly methods and devices for information processing.

BACKGROUND

Through unstructured text, people can provide comments on an object (such as a product, service, organizational structure, etc.). For example, user comments are often displayed on product purchase pages or service display pages. For example, a questionnaire can include open-ended questions for respondents to provide textual comments. Such unstructured text typically contains rich information about the described object. It is desired to interpret and utilize this information.

SUMMARY

In the first aspect of the present disclosure, a method of information processing is provided. The method includes: determining a group of target factors for a target object based on an unstructured text set about the target object, each target factor representing an aspect of the target object; determining a causal-outcome event pair comprising a causal event and an outcome event by analyzing text in the text set; and determining, based on the causal-outcome event pair, a first causality between a first factor in the group of target factors and a second factor of the target object.

In the second aspect of the present disclosure, an electronic device is provided. The electronic device includes at least one processing circuit configured to determine a group of target factors for a target object based on an unstructured text set about the target object, each target factor representing an aspect of the target object; determine a causal-outcome event pair comprising a causal event and an outcome event by analyzing text in the text set; and determine, based on the causal-outcome event pair, a first causality between a first factor in the group of target factors and a second factor of the target object.

In some embodiments of the second aspect, the at least one processing circuit is further configured to determine at least one reference sentence matching the first causality from text of the text set; and determine a target sentence reflecting the first causality based on the at least one reference sentence.

In some embodiments of the second aspect, the at least one processing circuit is further configured to determine at least one reference sentence matching the first causality from text of the text set; and determine a causal strength of the first causality based on the number of the at least one reference sentence, the causal strength indicating an influence degree of the first factor on the second factor or an influence degree of the second factor on the first factor.

In some embodiments of the second aspect, the second factor comprises at least one of: a factor other than the first factor in the group of target factors, a first predefined factor of the target object, a factor of interest of the target object.

In some embodiments of the second aspect, the text set originates from responses to open-ended questions in an information collection form for the target object, and the information collection form comprises a closed-ended question for the first predefined factor.

In some embodiments of the second aspect, the at least one processing circuit is further configured to: determine a second causality indicating that a second predefined factor of the target object affects a factor of interest of the target object; and determine, based on the text set, a second target sentence reflecting the second causality.

In some embodiments of the second aspect, determining the first causality comprises one of the following: in accordance with a determination that the causal event involves the first factor and the outcome event involves the second factor, determining the first causality as that the first factor affects the second factor, in accordance with a determination that the causal event involves the second factor and the outcome event involves the first factor, determining the first causality as that the second factor affects the first factor.

In some embodiments of the second aspect, the at least one processing circuit is further configured to: for an event of the causal event or the outcome event, determining that the event involves the first factor based on determining at least one: that text representing the event comprises words representing the first factor, that text representing the event matches semantically with words representing the first factor.

In some embodiments of the second aspect, determining the causal-outcome event pair comprises: determining, based on text in the text set, the causal-outcome event pair according to a self-trained natural language processing model.

In some embodiments of the second aspect, the at least one processing circuit is further configured to: present an element representing the first factor and an element representing the second factor in association.

In some embodiments of the second aspect, presenting an element representing the first factor and an element representing the second factor in association comprises: presenting a first node representing the first factor and a second node representing the second factor; and presenting an edge connecting the first node and the second node.

In some embodiments of the second aspect, the at least one processing circuit is further configured to: present, in association with the edge, a target sentence reflecting the first causality.

In some embodiments of the second aspect, a saliency degree of the edge is related to a causal strength of the first causality, and the causal strength indicates an influence degree of the first factor on the second factor or an influence degree of the second factor on the first factor.

In a third aspect of this disclosure, an electronic device is provided. The device includes at least one processing unit; and at least one memory, coupled to the at least one processing unit and storing instructions for execution by at least one processing unit, which causes the device to implement the method of the first aspect when executed by the at least one processing unit.

In the fourth aspect of this disclosure, a computer readable storage medium is provided. The computer readable storage medium stores a computer program, which can be executed by a processor to implement the method of the first aspect.

It should be understood that the content described in the content section of the present invention is not intended to limit the key or important features of the embodiments of the present disclosure, nor is it used to limit the scope of the present disclosure. The other features disclosed in the present disclosure will become easier to understand through the following description.

DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which:

FIG. 8 illustrates a flowchart of the information processing process according to some embodiments of the present disclosure; and FIG. 9 illustrates a block diagram of a device capable of implementing multiple embodiments of the present disclosure.

DETAILED DESCRIPTION

Figure 1:
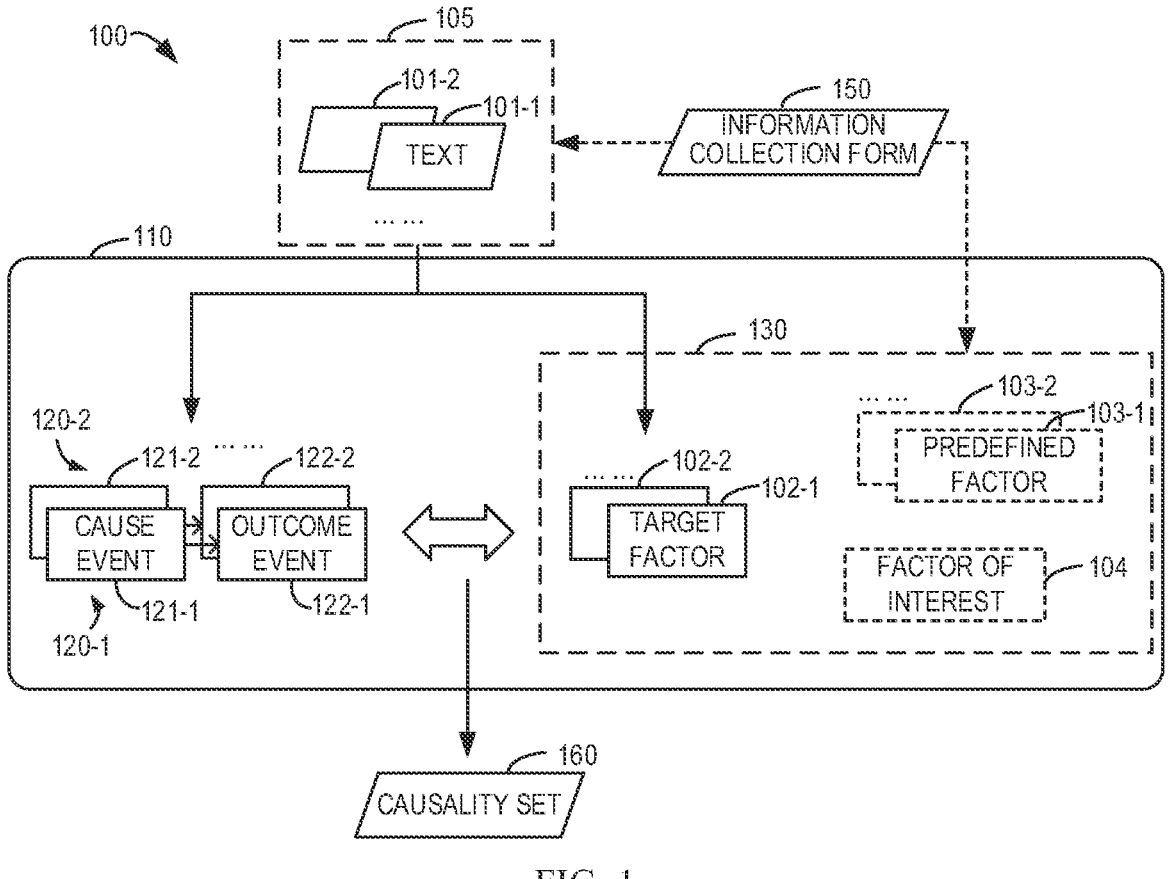
FIG. 1 illustrates a schematic diagram of an example environment in which the embodiments of the present disclosure can be implemented.

Embodiments of the present disclosure will be described in more detail below with reference to the accompanying drawings. Although some embodiments of the present disclosure have been illustrated in the accompanying drawings, it is to be understood that the present disclosure may be implemented in various manners and should not be construed to be limited to embodiments described herein. On the contrary, these embodiments are provided for a more thorough and complete understanding of the present disclosure. It is to be understood that the accompanying drawings and embodiments of the present disclosure are only for the purpose of illustration, rather than limiting the protection scope of the present disclosure.

In the description of the embodiments of the present disclosure, the term "including" and similar terms are to be understood as open terms, that is, "including but not limited to". The term "based on" is to be understood as "based at least in part on". The terms "one embodiment" or "the embodiment" are to be understood as "at least one embodiment". The term "some embodiments" is to be understood as "at least some embodiments". Other definitions, either explicit or implicit, may be included below.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "model" may learn a correlation between corresponding inputs and outputs from training data, so that after training is completed, a corresponding output can be generated for a given input. The generation of a model may be based on machine learning technology. Deep learning is a machine learning algorithm that uses multiple layers of processing units to process inputs and provide corresponding outputs. In this article, a "model" may also be referred to as a "machine learning model", a "machine learning network", or a "network", and these terms are used interchangeably herein. A model may also include different types of processing units or networks.

As briefly mentioned above, unstructured text about an object contains rich information about that object. Expect to be able to interpret and utilize such information. On the other hand, causalities have been widely applied in various fields to explore the causalities between various factors of an object. Traditionally, the causality between known factors of an object can be obtained. However, traditional solutions do not uncover the implicit factors contained in unstructured text, and therefore cannot reveal the causality between such implicit factors and other factors of the object. This leads to incomplete causality mining of related objects.

The embodiments of the present disclosure proposes a scheme for information processing. Based on an unstructured text set about the target object, a group of target factors for a target object is determined. Each target factor represents an aspect of the target object. By analyzing text in the text set, a causal-outcome event pair comprising a causal event and an outcome event is determined. Based on the causal-outcome event pair, determine the causality between the first factor in a group of target factors and the second factor of the target object.

In this solution, implicit factors are extracted from the text of the target object. Further, causalities related to implicit factors are determined based on the text. In this way, the causality between different implicit factors or between implicit factors and known factors can be revealed. Therefore, this solution helps to improve the mining of causalities among target objects, thereby facilitating the improvement of the target object.

Example Environment

FIG. 1 illustrates a schematic diagram of an example environment 100 that can be implemented in the embodiments of the present disclosure. In the environment 100, a computing device 110 receives the text set 105 about the target object, or the computing device 110 extracts the text set 105 from the original data. The text set 105 includes multiple texts 101-1, 101-2, . . . , and it is also collectively or individually referred to as Text 101. The target object may include any tangible object, intangible object, and their combination. For example, the target object may be a product, such as household goods, food, and so on. For another example, the target object may be a service, such as cloud computing service, a cloud storage service, and so on. For example, the target object may be an entity providing services and goods such as a flight, a restaurant, a hotel, and so on. The target object may also be an organizational structure, such as a company.

The text 101 may be a description of the target object by a user of the target object. The text 101 may include a sentence with sentiment, for example "apple is good" or "apple tastes bad". The text 101 may also include a sentence with no sentiment, for example "I ate an apple". The text 101 may be evaluation, comments, reviews, assessments, suggestions, feelings, and so on, for the target object. The text 101 contains information about the factors that affect the target object. Each text 101 in the text set 105 may be provided by different users or by the same user at different times.

In some embodiments, the text 101 may be user evaluation on a display page of the target object. The display page may be derived from a shopping app (APP), a service providing APP, a review APP, and so on.

In some embodiments, the text 101 may be derived from an information collection form 150 for the target object, as shown in FIG. 1. As used herein, the "information collection form" is used to collect a description of the target object (for example, evaluation, a feeling, and so on), and may be used as an electronic questionnaire, a review, and so on. The information collection form 150 includes an open-ended question about the target object. The computing device 110 may collect responses from respondents to open-ended questions in the information collection form as text 101.

Figure 2:
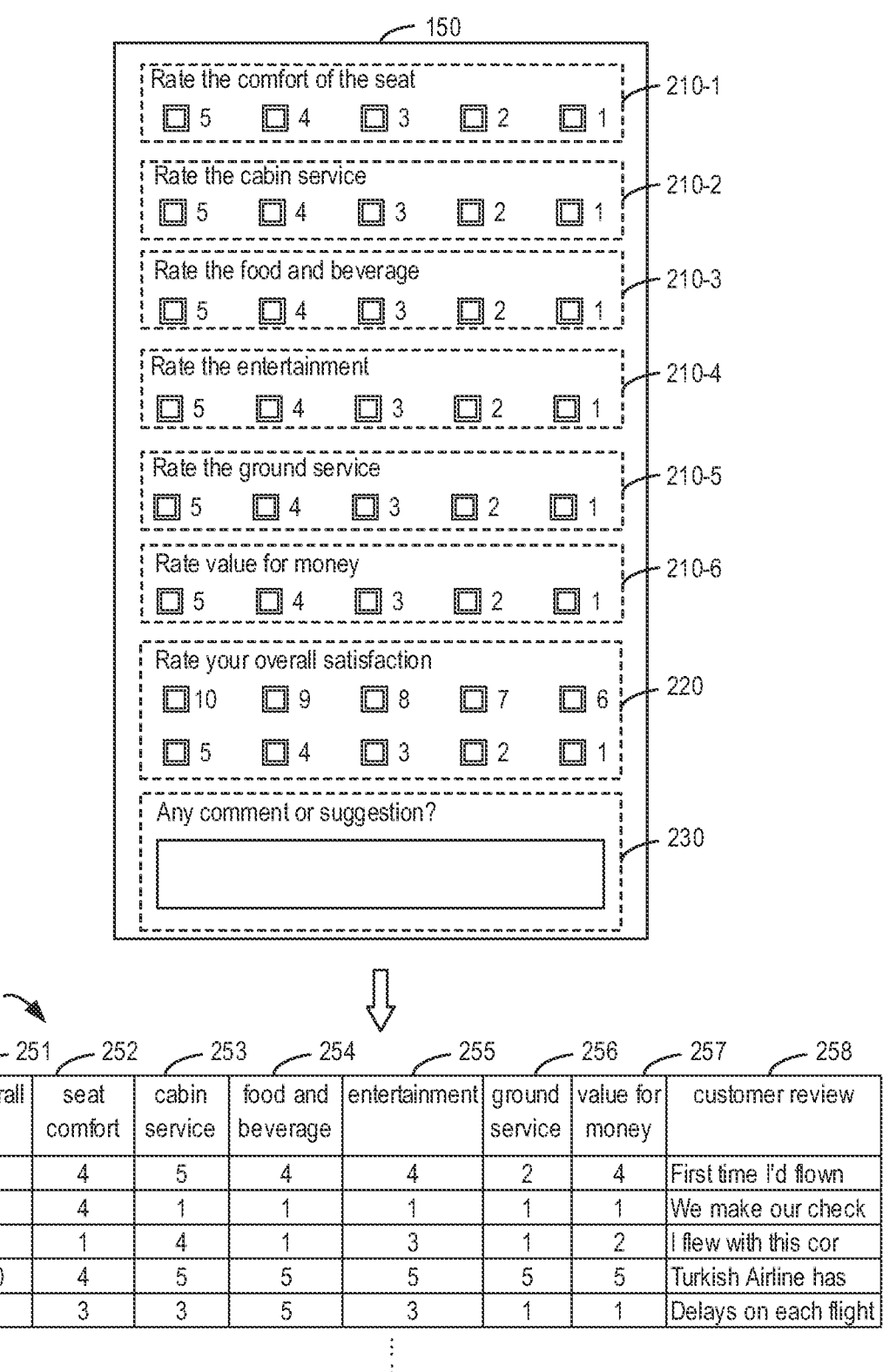
FIG. 2 illustrates an example of an information collection form according to some embodiments of the present disclosure.

FIG. 2 illustrates an example of information collection form 150. In this example, the information collection form 150 for a certain flight includes an open-ended question 230. A user may provide feedback to the flight through text boxes. A response set 250 of the information collection form 150 is shown in a form of table. Each row in the response set 250 represents a response record from the same respondent. In each response record, a column 258 is a response to the open-ended question 230. The text 101 may be the text in the column 258.

Continuing with reference to FIG. 1, the computing device 110, based on the text set 105, determines target factors 102-1, 102-2, . . . of the target object which are also collectively referred to as a group of target factors 102 or individually as a target factor 102. Such a target factor 102 is determined from unstructured text and is therefore also known as an "implicit factor" or "extracted factor". Target factors may be considered as unstructured factors.

In some embodiments, as shown in FIG. 1, the computing device 110 may also receive or determine predefined factors 103-1, 103-2, . . . of the target object which are also collectively referred to as a group of predefined factors 103 or individually as a predefined factor 103. As used herein, the term "predefined factors" refers to a factor that has a predetermined option (for example, a predetermined value, a category, a star rating, and so on) in a criterion. For the predefined factor, a user may choose an option from the predetermined options to evaluate or describe the target object from a perspective of the predefined factor. The predefined factor is quantitative and highly organized. The description for the predefined factors (for example, evaluation, assessment) is not open-ended, but needs to comply with an architecture with predetermined options. Therefore, predefined factors may also be considered as structured factors.

The predefined factor may also include numerical factor or categorical factor. The predetermined options for the numerical factor include predetermined values or predetermined star ratings. The predetermined options for the categorical factor include predetermined categories, such as categories of the cabin.

In some embodiments, as shown in FIG. 1, the computing device 110 may also receive or determine factors of interest of the target object. As used herein, "factors of interest" refer to aspects of the target object that are of particular concern. Factors of interest may include a specific performance, service, function, overall performance, overall evaluation, or satisfaction of the target object.

The factor set 130 of the target object may include target factor 102 and optional predefined factors 103 and factors of interest 104. Herein, the target factor, the predefined factor and the factor of interest are also collectively or individually referred to as "factors".

In some embodiments, the predefined factor 103 may come from the information collection form 150, as shown in FIG. 1. The information collection form 150 may include a closed-ended question about the predefined factor 103. The closed-ended question refers to a question with an answer which is selected from predetermined options. In the example in FIG. 2, the information collection form 150 includes a closed-ended question 210-1 regarding the predefined factor "seat comfort", a closed-ended question 210-2 regarding the predefined factor "cabin service", a closed-ended question 210-3 regarding the predefined factor "food and beverage", and a closed-ended question 210-4 regarding the predefined factor "entertainment", a closed-ended questions 210-5 regarding the predefined factor "ground service" and a closed-ended question 210-6 regarding the predefined factor "value for money". The closed-ended question 210-1 to 210-6 are also collectively or individually referred to as closed-ended questions 210. Each closed-ended question 210 has 5 scores for a user to choose from. In the response set 250, columns 252-257 represent user responses to the closed-ended questions 210-1 to 210-6, respectively.

The factor of interest 104 may also come from the information collection form 150. In the example of FIG. 2, the information collection form 150 includes a closed-ended question 220 regarding the overall satisfaction of the target object. In the response set 250, a column 251 is the user's response to a closed-ended question 220. Therefore, in this example, the factor of interest for the target object is "overall satisfaction".

In the example in FIG. 2, the target object is the flight. As another example, the target object may be a certain product. The predefined factor may include factors such as an appearance, quality, price, and characteristics of the product. The factor of interest may be, for example, a brand value of the product. As another example, the target object may be a company. The predefined factor may include a factor such as employee salary, office location, working hours, and promotion path. The factors of interest may be, for example, employee satisfaction or employee willingness to leave.

Continue to refer to FIG. 1. The target factor 102 is an implicit factor in the unstructured text. The causality between the target factor 102 and another factor of the target object may be revealed. For example, it is expected to determine whether there is a causality between the target factor 102 and another target factor, the predefined factor 103, or the factor of interest 104.

For this purpose, the computing device 110 may determine the causality between the target factor 102 and another factor based on the text in the text set 105. In some embodiments, a causality model for processing text input may be utilized. This model may determine the target factor 102 and the causality involving the target factor 102 based on the text in the text set 105.

In some embodiments, the computing device 110 determines one or more causal-outcome event pairs 120-1, 120-2, . . . by analyzing the text 101 in the text set 105, and it is also collectively or individually referred to as causal-outcome event pair 120. Each causal-outcome event pair includes causal events and corresponding outcome events. For example, a causal-outcome event pair 120-1 includes a causal event 121-1 and an outcome event 122-1, while a causal-outcome event pair 120-2 includes a causal event 121-2 and an outcome event 122-2. The causal event 121-1, 121-2, . . . are also collectively or individually referred to as causal event 121, and the outcome event 122-1, 122-2, . . . are also collectively or individually referred to as causal event 122.

The computing device 110 generates a causality set 160 by matching the cause event 121 and the outcome event 122 with factors in the factor set 130. The causality set 160 includes at least a causality between a certain target factor 102 and another factor of the target object (for example, another target factor, predefined factor, factor of interest). In some embodiments, the causality set 160 may also include causalities between the predefined factor 103 and the factor of interest 104. The computing device 110 may obtain such causalities in any suitable way, for example receiving from other devices or using appropriate methods to determine on its own. The embodiments of the present disclosure are not limited in this aspect.

In the environment 100, the computing device 110 may be any type of device capable of computing, including a terminal device or a server device. The terminal device may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camera, a positioning device, a television receiver, a radio broadcasting receiver, an e-book device, a gaming device, or any combination thereof, accessories and peripherals of these devices or any combination thereof. For example, the server device may include a computing system/server, such as mainframe, an edge computing node, a computing device in the cloud environment, and so on.

It should be understood that descriptions of the structure and functionality of the environment 100 is only for illustrative purposes and does not imply any limitations on the scope of the present disclosure. Although the computing device 110 is shown separately in FIG. 1, in some embodiments, various operations described herein can be implemented by multiple computing devices. Although the target factor and causality are shown separately, the target factor and corresponding causality may be determined by the same model based on the text set 105.

In addition, the information collection form shown in FIG. 2 is only illustrative and is not intended to limit the scope of the present disclosure. The open-ended question, the closed-ended question, and their numbers shown in FIG. 2 are only illustrative. In the embodiments of the present disclosure, the information collection form may have any suitable number of open-ended questions and closed-ended questions. Furthermore, although english is used as an example, the embodiments of the present disclosure may be used to process text and information collection forms in any language.

Extraction of Target Factors

Figure 3:
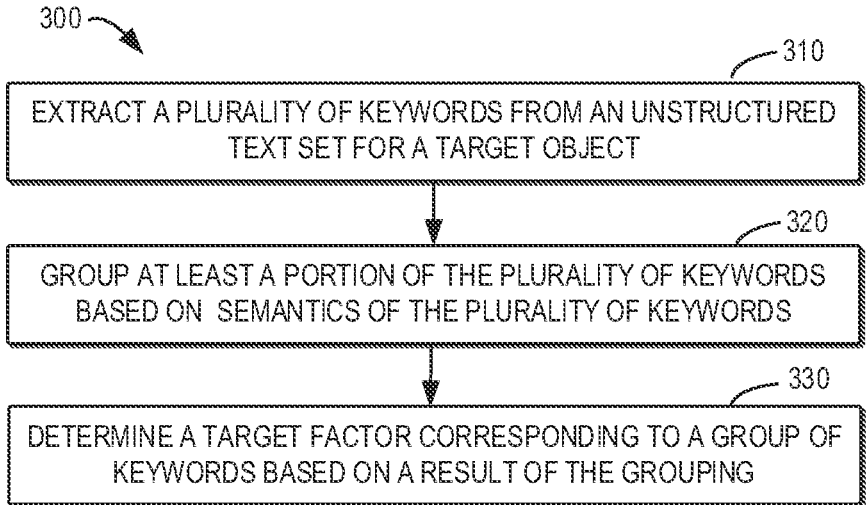
FIG. 3 illustrates a flowchart of the process of determining target factors according to some embodiments of the present disclosure.

As described in FIG. 1 above, in order to explore potential causalities related to the target object, implicit factors need to be extracted from unstructured text. The following describes an example process. FIG. 3 illustrates a flowchart of a process 300 for determining target factors according to some embodiments of the present disclosure. Process 300 may be implemented at the computing device 110. For sake of discussion, the process 300 is described with reference to FIG. 1.

At block 310, the computing device 110 extracts a plurality of keywords from an unstructured text set 105 for a target object. The extracted keywords may have any suitable number of segments. The keywords may include one-segment keyword such as "flight", "seat", "service", and so on, and a two-segment keyword such as "cabinet crew", "flight attendant", and so on. Any suitable keyword extraction algorithm may be used, for example but not limited to TF-IDF, KP Miner, SBKE, RAKE, TextRank, YAKE, Key-BERT, and so on.

In some embodiments, before applying the keyword extraction algorithm, the text 101 in the text set 105 may be preprocessed, for example named entities and stop words may be removed. For example, a named entity may be a person name, an organization name, a geographical name, and so on, which do not describe any aspect of the target object. For English text, a stop word, for example, may be "a", "an", "the", "and", and so on. For Chinese text, a stop word, for example, may be "a", "one", "and", "but", and so on. Alternatively, in some embodiments, the text 101 may be preprocessed by a keyword extraction algorithm.

In some embodiments, a keyword extraction algorithm may be used to extract nouns as keywords from the text set 105. In this way, words that cannot describe other attributes of an aspect of the target object may be avoided to be extracted, which may effectively reduce the difficulty of subsequent processing.

In some embodiments, the computing device 110 may extract keywords based on the number of occurrences (i.e., word frequency) of each word in the text set 105. Specifically, the computing device 110 may extract candidate words from text 101 in the text set 105. If the number of occurrences of a candidate word in the text set 105 exceeds the threshold, the candidate word is determined as one of the keywords. If the number of occurrences of the candidate word in the text set 105 is less than the threshold number, the candidate word is removed.

For example, keyword extraction algorithms may be used to extract candidate words from the column 258 of each response record. For each extracted candidate word, the number of occurrences of the extracted candidate word in the entire text set 105 is computed. Candidate words with the number of occurrences exceeding the threshold number are determined as keywords, while candidate words with the number of occurrences less than the threshold number are removed. In this embodiment, by filtering the preliminarily extracted candidate words, the determination of target factors may be avoided to be interfered with unimportant words.

Alternatively, in some embodiments, the computing device 110 may extract keywords based on semantics of text 101 in the text set 105. For example, semantic analysis may be used to determine sentences with sentiment, and nouns related to sentiment in such sentences may be used as keywords.

At block 320, the computing device 110 groups at least a portion of the plurality of keywords based on semantics of the plurality of keywords. In some embodiments, all keywords may be grouped. In some embodiments, keywords may be filtered based on the preliminary results of grouping, and the filtered keywords may be grouped.

The computing device 110 may use clustering to group a plurality of extracted keywords. To this end, a word vector representing semantics is generated for each keyword. Any suitable method may be used to generate the word vector, for example word2vector, GloVe, and so on. The embodiments of the present disclosure are not limited in this regard.

The plurality of keywords may be clustered based on word vectors to determine a plurality of clusters, where each cluster includes at least one keyword. A clustering algorithm may divide these keywords into independent and non-overlapping clusters based on semantic similarity. Any suitable clustering algorithm may be used, for example K-Means, Density-Based Spatial Clustering of Applications with Noise (DBSMAY), a Gaussian Mixture model, and so on.

In some embodiments, keywords may be filtered based on quality of each cluster. The quality of a cluster represents an aggregation degree in terms of semantic of keywords in the cluster. For example, a sum of square distances of keywords in a cluster may be used as the quality of the cluster. Alternatively, or additionally, the Silhouette coefficient may also be used as the quality of the cluster.

The quality of each cluster obtained by clustering may be determined. In some embodiments, keywords in a cluster with the quality lower than a threshold quality may be removed to determine remaining keywords. The remaining keywords may be grouped based on semantics of the remaining keywords. For example, the remaining keywords may be clustered. The keywords obtained in the same cluster are considered as a group of keywords. Alternatively, in some embodiments, a cluster with the quality lower than a threshold quality may be removed and other clusters with the quality higher than the threshold quality may be retained. For the retained clusters, keywords within the same cluster are considered as a group of keywords. In this embodiment, there is no need to regroup the remaining keywords.

Figure 4:
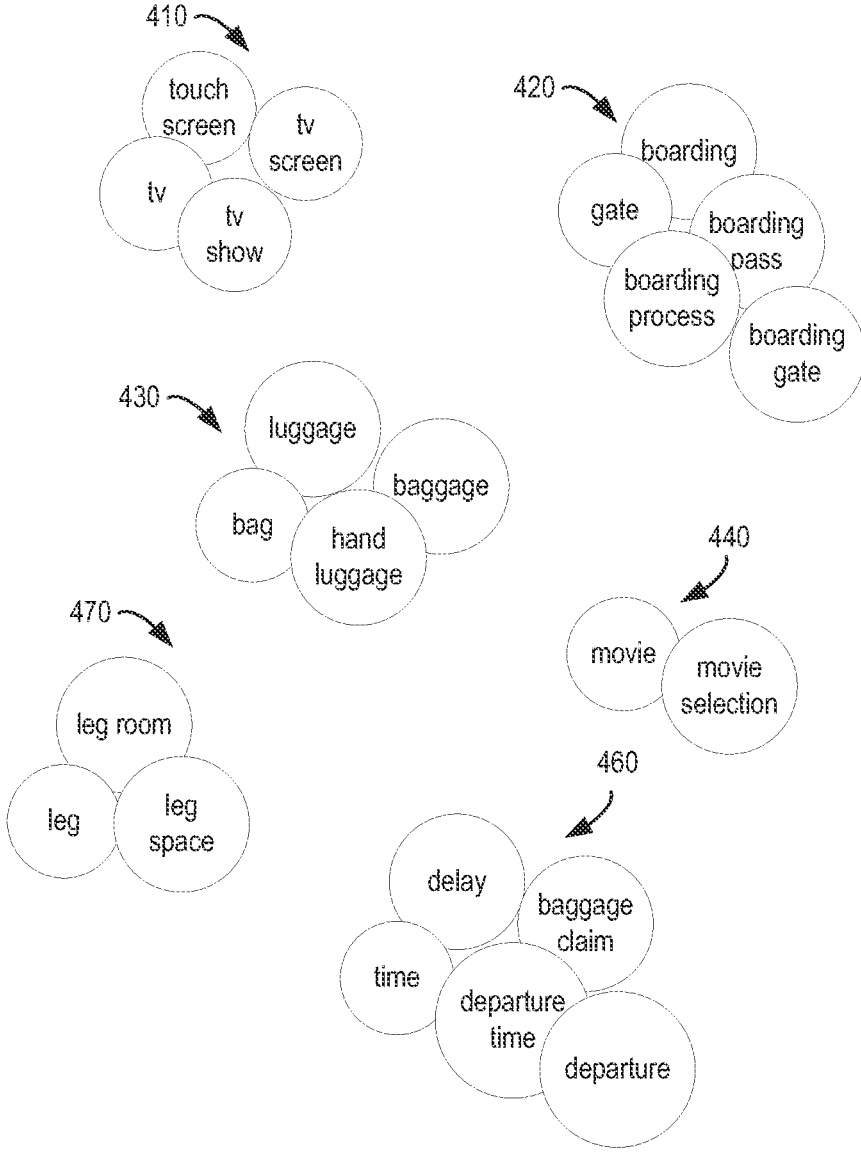
FIG. 4 illustrates a schematic diagram of keyword grouping according to some embodiments of the present disclosure.

FIG. 4 illustrates an example of keyword grouping. The result of grouping may be obtained by processing the text in the column 258 of the response set 250. In FIG. 4, a keyword grouping 410, a keyword grouping 420, a keyword grouping 430, a keyword grouping 440, a keyword grouping 460, and a keyword grouping 470 are determined through clustering. Each keyword grouping includes one or more keywords.

Continue to refer to FIG. 3. At block 330, the computing device 110 determines the target factor 102 corresponding to a group of keywords based on a result of the grouping. The target factor 102 represents an aspect of the target object. The same group of keywords has similar semantics, therefore representing the same aspect of the target object. Given this, a group of keywords may correspond to the target factor 102.

The name or identification of the target factor 102 corresponding to a group of keywords may be determined based on the group of keywords. As an example, any keyword in this group of keywords may be used to represent a corresponding target factor. As another example, a center of a cluster composed of a group of keywords may be determined, and the corresponding target factor may be represented by the keyword with the closest semantic feature to the center. As another example, the aspect of the target object described by this group of keywords (for example, a service or performance) may be used to represent the target factor.

In the example in FIG. 4, the target factor corresponding to the keyword grouping 410 is "TV service". The target factor corresponding to the keyword grouping 420 is "boarding procedure". The target factor corresponding to the keyword grouping 430 is "luggage service". The target factor corresponding to the keyword grouping 440 is "movie service". The target factor corresponding to the keyword grouping 460 is "time delay". The target factor corresponding to the keyword grouping 470 is "leg room".

In some embodiments, one or more groups of keywords that are the same or similar to predefined factors may be removed. In this case, the computing device 110 determines the target factor corresponding to the group of keywords that have not been removed. For example, for each group of keywords, the computing device 110 may determine whether the group of keywords is similar to a predefined factor of the target object in terms of semantics. If the group of keywords is not similar to any predefined factor in terms of semantics, the target factor is determined based on the group of keywords. If the group of keywords is similar to a predefined factor in terms of semantics, the group of keywords may be removed.

As an example, by processing the text in the column 258, a group of keywords "food", "meal", "drink", "snack" may be obtained. The group of keywords is similar to a predefined factor "food and beverage" in FIG. 2 in terms of semantics. Correspondingly, the group of keywords is removed without the need to determine the corresponding target factor.

Through the above process 300, factors for the target object are extracted from open-ended textual comments or reviews. In this way, the information contained in the unstructured text is analyzed, which helps to discover new factors that affect the target object. It should be understood that process 300 is exemplary. In the embodiments of the present disclosure, any suitable method may be used to extract implicit factors from the text.

Causation Extraction

As described with reference to FIG. 1, in addition to the target factor 102, the computing device 110 also extracts causal-outcome event pairs 120 from the text set 105, each of which includes a causal event 121 and an outcome event 122. Further, the computing device 110 matches a causal event and an outcome event with the factors in the factor set 130 to determine the causality between the two factors.

Figure 5:
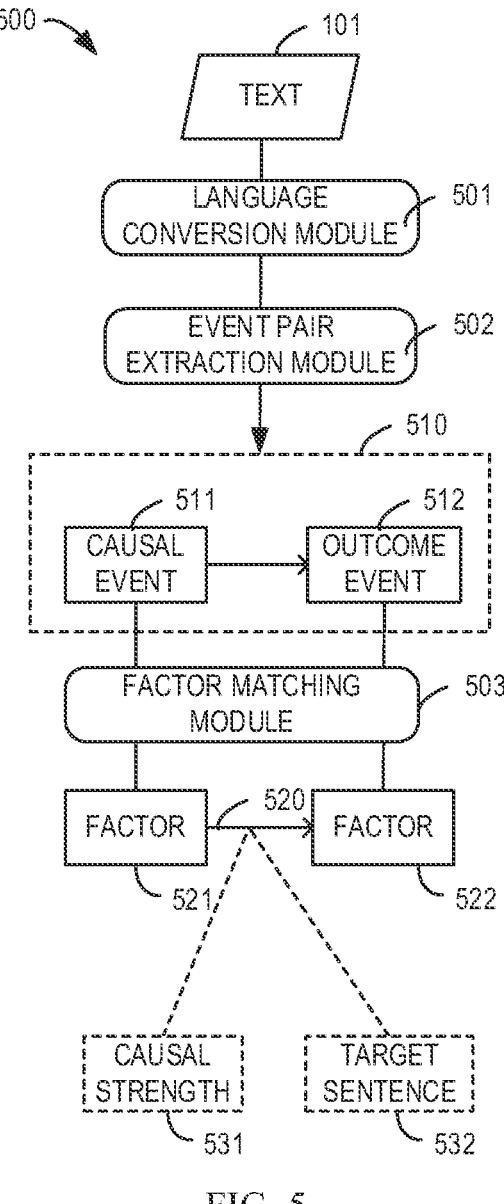
FIG. 5 illustrates a schematic diagram of the architecture for extracting causalities according to some embodiments of the present disclosure.

FIG. 5 illustrates a schematic diagram of the architecture 500 for extracting causalities according to some embodiments of the present disclosure. As shown in FIG. 5, a language conversion module 501 may convert the text 101 into a text in a target language. The language conversion module 501 may be implemented in any suitable way. For example, the language conversion module 501 may be implemented by translating Application Programming Interface (API).

In the case where the text set 105 includes the texts in different languages, or in the case where the text 101 is different from the target language, the language conversion module 501 may be used to convert the text 101 into the same target language. It should be understood that in some embodiments, the language conversion module 501 may not be used. For example, in the case where the text 101 is all in the target language, or in the case where an event pair extraction module 503 has the ability of handling a plurality of language texts, the language conversion module 501 may not be used.

The text 101 with target language may be fed to the event pair extraction module 502. The event pair extraction module 502 determines the causal-outcome event pair 510, including the causal event 511 and the outcome event 512, by analyzing the text 101. It should be understood that the causal-outcome event pair 510 is an example of the causal-outcome event pair 120 shown in FIG. 1. Furthermore, although only one causal-outcome event pair 510 is shown, the event pair extraction module 502 may extract any number of causal-outcome event pairs.

The event pair extraction module 502 may use any suitable method to determine the causal-outcome event pair 510. For example, a rule template may be used to extract the causal-outcome event pair 510 from the text 101. For another example, a model modeled as a sequence label task may be used to extract the causal-outcome event pair 510. In this example, the text 101 is represented as a sequence of words or characters, and the model outputs a label sequence of the same length. The label sequence identifies the position of the cause event and the outcome event in the text. Such model is trained end-to-end.

In some embodiments, the event pair extraction module 502 may determine the causal-outcome event pair 510 based on the text 101 in the text set 105 according to the self-trained Natural language processing (NLP) model. The NLP model is configured to extract causal-outcome event pairs from natural language texts. The NLP model is trained simultaneously on a small amount of labeled data and a large amount of unlabeled data. The training of this NLP model does not rely on a large amount of labeled data and may fully utilize the information in unlabeled data to improve the performance of the model.

As an example, the NLP model may include a language representation model, a conditional random field model, and a noise adaptation layer. The language representation model is used to generate word vectors for the text 101 and may be implemented using any suitable network structure. For example, the language representation model may be a Bidirectional Encoder Representations from Transformers (BERT) model. The conditional random field model is used to label data without labels. The noise adaptation layer is used to generate a noise matrix for each word from its word vector.

Compared with template matching and sequence label task models, the self-trained NLP model has higher accuracy and better generalization ability. Using such a model for causal-outcome event pair extraction may more accurately and comprehensively extract causal-outcome event pairs.

A factor matching module 503 determines a causality 520 between the factors 521 and 522 based on the causal-outcome event pair 510. In the example in FIG. 5, the causality 520 is the factor 521 influencing the factor 522. At least one of the factors 521 and 522 is the target factor 102.

If the factor matching module 503 determines that the cause event 511 involves the factor 521, and the outcome event 521 involves the factor 522, then the causality 520 is determined as the factor 521 influencing the factor 522.

In some embodiments, it is possible to determine whether an event involves a certain factor through precise matching. If the text representing a certain event includes words representing a certain factor, it may be determined that the event involves that factor. For example, in the case where the text representing the causal event 511 includes words representing the factor 521, the factor matching module 503 determines that the causal event 511 involves the factor 521. In the case where the text representing the outcome event 512 includes words representing the factor 522, the factor matching module 503 determines that the outcome event involves the factor 522.

The text representing the event may be obtained from the text set 105. For example, when performing event pair extraction, the event pair extraction module 502 may determine the text representing the causal-outcome event pair and determine the text representing the cause event and the text representing the outcome event from it. The word representing a factor may be the name or part of the name of the factor, for example, for the target factor "leg room", the word representing the factor may be leg room or leg.

Alternatively, or additionally, the word representing a factor may be a word with a semantic similarity to that factor. For the target factor 102, the word representing the target factor 102 may be a keyword in the keyword grouping used to determine the target factor in process 300. For example, for the target factor "luggage service", the words representing that factor may be the words "bag", "luggage", "baggage", and "hand luggage" in the keyword grouping 430. For the predefined factor 103 or the factor of interest 104, the words that are semantically similar to that factor may be determined in any suitable way. The embodiments of the present disclosure are not limited in this regard.

Alternatively, or additionally, in some embodiments, fuzzy matching may be used to determine whether an event involves a certain factor. If the text representing a certain event matches semantically with the word representing a certain factor, it may be determined that the event involves that factor. For example, in the case where the text representing the causal event 511 matches semantically with the word representing the factor 521, the factor matching module 503 determines that the causal event 511 involves the factor 521. In the case where the text representing outcome event 512 matches semantically with the word representing the factor 522, the factor matching module 503 determines that the outcome event involves the factor 522.

The factor matching module 503 may use any suitable fuzzy matching method. For example, the text representing an event and the word representing a factor may be input into a language representation model (for example, BERT) for encoding to generate an embedding vector for the event and an embedding vector for the factor. If the difference between these two embedding vectors is less than the threshold difference, it may be determined that the text representing the event matches semantically with the word representing the factor. Correspondingly, it may be determined that the event involves this factor. For another example, Jaccard similarity may be used to determine whether the text representing the event and the word representing the factor match semantically.

Figure 6:
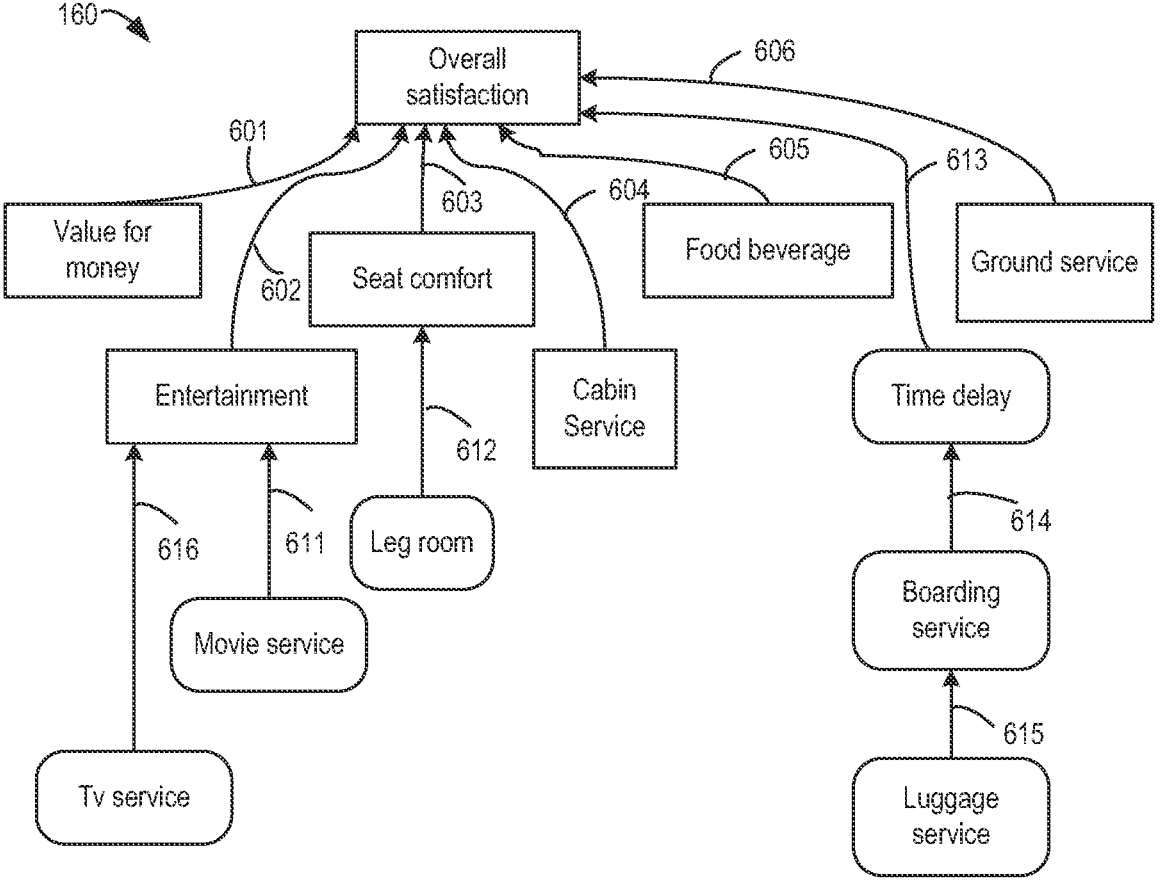
FIG. 6 illustrates an example of a causality set according to some embodiments of the present disclosure.

The above describes an example operation of the factor matching module 503. In order to have a clearer understanding of event pair extraction and factor matching according to the embodiments of the present disclosure, some examples will be described below. FIG. 6 illustrates an example of a causality set 160 according to some embodiments of the present disclosure.

In general, the causality set 160 involves factors of interest "overall satisfaction", predefined factors "value for money", predefined factors "entertainment", predefined factors "seat comfort", predefined factors "cabin service", predefined factors "food beverage", and predefined factors "ground service" described with reference to FIG. 2. As mentioned above, the causalities 601, 602, 603, 604, 605 and 606 between each predefined factor and the factor of interest "overall satisfaction" may be obtained using any suitable causality model.

The causality set 160 also involves the extracted target factors "movie service", "leg room", "time delay", "boarding service", and "luggage service" as described with reference to FIG. 4. The causalities 611, 612, 613, 614, and 615 related to these target factors are determined through causal-outcome time pair extraction and factor matching.

As an example, by analyzing the text "Extra luggage weight leads to that we are unable to check in together" in the text set 105, causal-outcome event pairs may be determined, including the causal event "extra luggage weight" and the outcome event "unable to check in together". The cause event "extra luggage weight" matches the target factor "luggage service", and the outcome event "unable to check in together" matches the target factor "boarding service". Correspondingly, the causality 615 between the target factor "luggage service" and the target factor "boarding service" may be determined.

As another example, by analyzing the text "The 3-3-3 seats and plenty of leg room make the seats quite spacious" in the text set 105, the causal-outcome event pair may be determined, including the causal event "plenty of leg room" and the outcome event "the seats quite spacious". The cause event "plenty of leg room" matches the target factor "leg room", and the outcome event "the seats quite space" matches the predefined factor "seat comfort". Correspondingly, the causality 612 with the target factor "leg room" influencing the predefined factor "seat comfort" may be determined.

Similarly, the causality 614 with the target factor "boarding service" influencing the target factor "time delay" may be determined by analyzing the text "Chaotic boarding process causes a delay" in the text set 105. The causality 613 with the target factor "time delay" influencing the factor of interest "overall satisfaction" may be determined by analyzing the text "Delay makes me unsatisfied with the flight" in the text set 105.

Depending on the text in the text set 105, in some cases, a plurality of causalities may be determined based on a single causal-outcome event pair. If the causal event or the outcome event in a causal-outcome event pair involves two or more factors, a plurality of causalities may be determined based on the causal-outcome event pair. For example, the cause event "newly released TV shows and movies" and the outcome event "entertainment" may be determined by analyzing the text "Newly released TV shows and movies improved entertainment" in the text set 105. Due to the fact that the causal event involves two factors, namely the target factor "movie service" and "TV service", two causalities may be determined. Specifically, the causality 611 with the target factor "movie service" influencing the predefined factor "entertainment" may be determined, and the causality 616 with the target factor "TV service" and the predefined factor "entertainment" may be determined.

It should be understood that the causality set 160 shown in FIG. 6 is only exemplary and is not intended to limit the scope of the present disclosure. The causality set 160 may involve any number of factors. In some embodiments, the causality set 160 may only involve target factors, without involving predefined factors and factors of interest. Furthermore, in the above example described with reference to FIG. 6, causal-outcome event pairs are determined based on one sentence, but this is only exemplary. The same causal-outcome event pair may be extracted from a plurality of different sentences.

The above describes an example of causal-outcome event pair extraction and factor matching. In the embodiments of the present disclosure, implicit factors are extracted from the text and causal-outcome event pairs are mined from the text, and causalities related to the target factor are determined based on causal-outcome event pairs that match the target factor. On the one hand, in this way, the causality about the target object has been mined and supplemented. On the other hand, both implicit factors and causal-outcome event pairs originate from the text about the target object, in this way, making the causality determined more accurate.

Continue to refer to FIG. 5. In some embodiments, the computing device 110 may also determine the causal strength 531 of the causality 520. The causal strength 531 indicates the influence degree of the factor 521 on the factor 522. The causal strength 531 of the causality 520 may be determined based on the number of reference sentences that match the causality 520.

The reference sentence that matches a causality 520 may be a sentence that semantically expresses the causality 520. For example, reference sentences may include sentences that extract corresponding causal-outcome event pairs 510 from them. For example, for the causality 611 shown in FIG. 6, the reference sentence may include "Newly released TV shows and movies improved entertainment". For the causality 612, the reference sentence may include "The 3-3-3 seats and plenty of leg room make the seats quite spacious".

In some embodiments, the computing device 110 may also determine the target sentence 532 that reflects the causality 520. The computing device 110 may further determine the target sentence 532 based on at least one reference sentence that matches the causality 520. In some embodiments, one or more sentences in the reference sentence may be selected as the target sentence 532. For example, the sentence "Chaotic boarding process causes a delay" may be used as the target sentence for the causality 614. Alternatively, or additionally, reference sentences may be merged into the target sentence 532 by using appropriate Natural Language Processing methods.

Displaying causalities alone may not be intuitive and easy to understand. The use of target sentences may explain causalities and provide an intuitive understanding of how the factor 521 influences the factor 522. The target sentence may also serve as evidence of causalities. This further helps to improve the target object by adjusting factors.

In some embodiments, the computing device 110 may determine target sentences that reflect the causality between predefined factors 103 and factors of interest 104. The reference sentence that matches the causality may be determined from the text in the text set 105, and the target sentence may be determined based on the reference sentence. For example, one or more reference sentences may be determined as the target sentence, or a plurality of reference sentences may be merged into the target sentence.

As an example, sentences involving both predefined factors 103 and factors of interest 104 may be extracted from the text set 105. If the causal trigger words (for example cause, lead to, due to, and so on) in the sentence indicate that the predefined factor 103 involves the cause event, and the factor of interest 104 involves the outcome event, then the sentence may be determined as a reference sentence. For the causality 603 between the predefined factor "seat comfort" and the factor of interest "overall satisfaction" shown in FIG. 6, an example of the target sentence could be "Comfort seating and the latest entertainment make this flight one of the highlights of our trip".

Similar to the determination of causalities, there may be sentences that reflect a plurality of causalities. For example, the causal event in the sentence "Comfort seating and the latest entertainment make this flight one of the highlights of our trip" involves two factors. Therefore, this sentence may be used as both the target sentence of causality 602 and the target sentence of causality 603.

Presenting the causality between the predefined factor 103 and the factor of interest 104 separately may not be intuitive and easy to understand. In this way, the causality between the predefined factor 103 and the factor of interest 104 may be explained.

It should be understood that the various modules in the architecture shown in FIG. 5 are only exemplary and are not intended to limit the scope of the present disclosure. The operations and functions described with reference to FIG. 5 may be implemented by the same module or model.

In addition, although described separately, the determination of target factors and the extraction of causality may be implemented by the same module or model. Such modules or models are configured to determine target factors and causalities involving target factors based on a text set. In other words, a natural language text set may be input into such a module or model to obtain the target factor and the causality set, which includes causalities involving the target factor.

Presentation of Causality Sets

The causality set 160 may be presented at the computing device 110 or other suitable display device. For this purpose, elements representing the factor 521 and elements representing the factor 522 may be presented in association. In some embodiments, the causalities in the causality set 160 may be presented in a table format. For example, two associated cells in a table may represent the factor 521 and 522, respectively.

Figure 7:
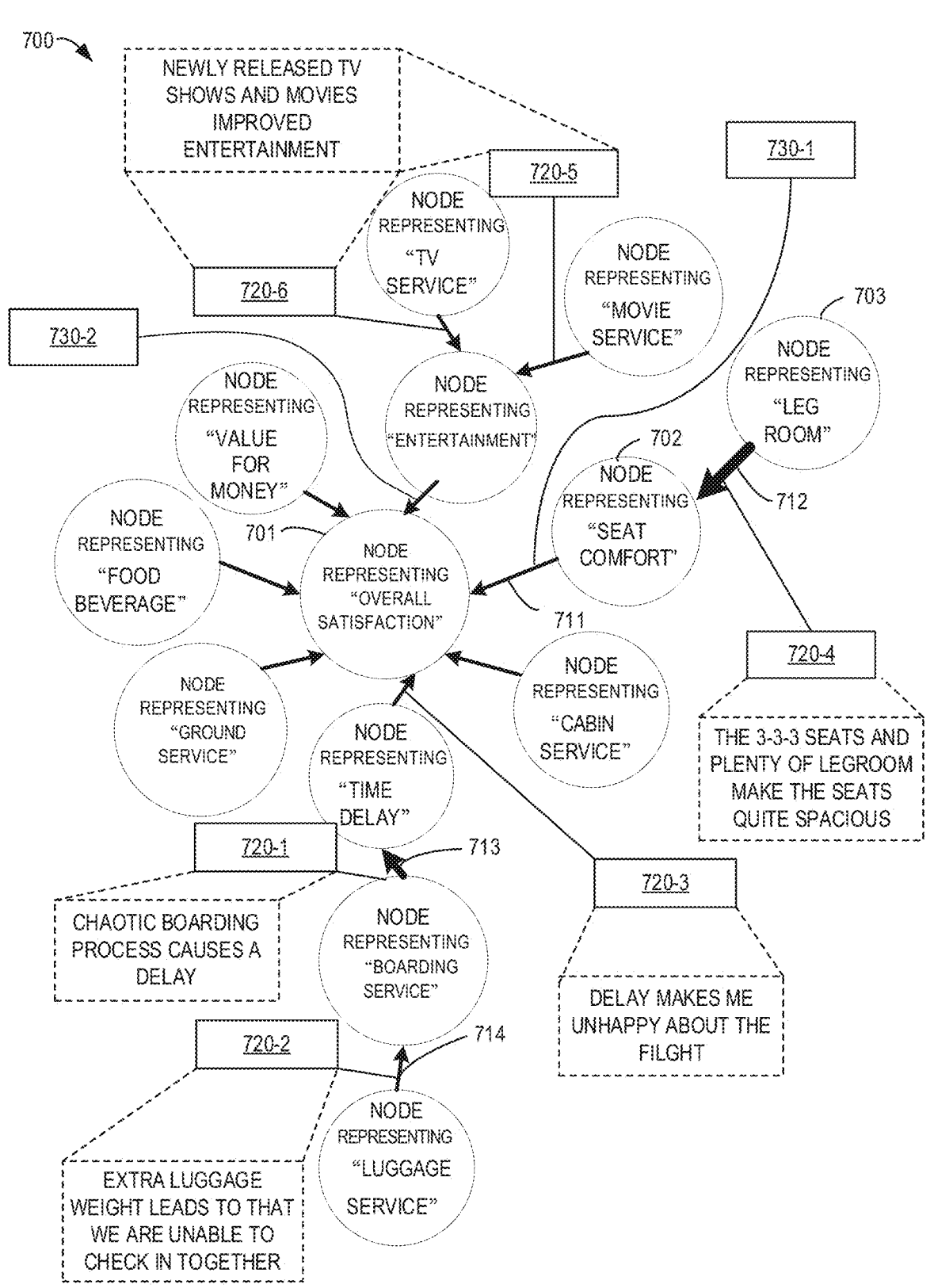
FIG. 7 illustrates examples of graphs representing causalities according to some embodiments of the present disclosure.

In some embodiments, the causalities in the causality set 160 may be presented in a form of graphs. FIG. 7 illustrates examples of a graph 700 representing causalities according to some embodiments of the present disclosure. Graph 700 is used to represent the causality set 160 in FIG. 6.

The nodes in the graph 700 represent each factor in the causality set. For example, a node 701 represents the factor of interest "overall satisfaction", a node 702 represents the predefined factor "seat comfort", and a node 703 represents the target factor "leg room". The directional edges connecting two nodes represent the causality between the corresponding factors. For example, an edge 711 pointing from the node 702 to the node 701 indicates that the predefined factor "seat comfort" influences the factor of interest "overall satisfaction". For another example, an edge 712 pointing from the node 703 to the node 702 indicates that the target factor "leg room" influences the predefined factor "seat comfort".

In some embodiments, the eye-catching degree of edges (for example, color, thickness, and so on) is related to the strength of the corresponding causality. For example, an edge 713 is thicker than an edge 714, which means that the causality between the target factor "boarding service" and the target factor "time delay" is stronger than the causality between the target factor "luggage service" and the target factor "boarding service". For another example, the edge 712 is thicker than the edge 713, which means that the causality between the target factor "leg room" and the predefined factor "seat comfort" is stronger than the causality between the target factor "boarding service" and the target factor "time delay". In such embodiment, the strength of the causality may be shown intuitively.

In some embodiments, target sentences that reflect the corresponding causality may be displayed in association with edges in the graph 700. FIG. 7 illustrates text boxes 720-1, 720-2, 720-3, 720-4, 720-5, and 720-6, which are also individually or collectively referred to as text boxes 720. The target sentence that reflects the causality involving the target factor may be presented in the text box 720. For example, a target sentence reflecting the causality between the target factor "boarding service" and the target factor "time delay" may be presented in the text box 720-1, such as "Chaotic boarding process causes a delay". For another example, "Newly released TV shows and movies improved entertainment" may be presented in the text box 720-5 and 720-6. For another example, a target sentence that reflects the causality between the target factor "leg room" and the predefined factor "seat comfort" may be presented in the text boxes 720-4, for example the sentence "The 3-3-3 seats and plenty of leg room make the seats quite spacious".

For causalities between predefined factors and factors of interest, if there is a target sentence in the text set 105 that reflects the causalities, such target sentence may be presented. The text box 730-1 and 730-2 are also shown in FIG. 7, which are individually or collectively referred to as text boxes 730. For example, the sentence "Comfortable seating and the latest entertainment make this flight one of the highlights of our trip" may be presented in the text box 730-1 and 730-2.

The presentation of the text box 720 may be dynamic. For example, the text box 720 may be presented in response to detecting a click or selection on the edge 713. In such embodiment, by displaying the target sentence, users who are concerned about the target object may intuitively understand the causality involved. This helps users specify measures to improve the target object.

Example Process

FIG. 8 illustrates a flowchart of a process 800 of information processing according to some embodiments of the present disclosure. The process 800 may be implemented at computing device 110. For the convenience of discussion, the process 800 will be described refer to FIG. 1.

At block 810, the computing device 110 determines a group of target factors 102 for a target object based on an unstructured text set 105 about the target object, each target factor 102 representing an aspect of the target object. At block 810, computing device 110 may use any suitable method to determine target factor 102. For example, computing device 110 may perform the process 300 described above to extract target factor 102 from the text set 105.

At block 820, the computing device 110 determines a causal-outcome event pair comprising a causal event and an outcome event by analyzing text in the text set 105. In some embodiments, computing device 110 may determine a causal-outcome event pair based on the text in the text set 101 according to the self-trained Natural language processing model.

At block 830, the computing device 110 determines, based on the causal-outcome event pair, a first causality between a first factor in the group of target factors and a second factor of the target object. The first factor may be any target factor, and the second factor may be at least one of the following: another target factor, predefined factors of the target object, or factors of interest.

In some embodiments, the text set 105 originates from responses to open-ended questions in an information collection form 150 for the target object, and the information collection form 150 comprises a closed-ended question for the first predefined factor.

In some embodiments, in accordance with a determination that the causal event involves the first factor and the outcome event involves the second factor, determining the first causality as that the first factor affects the second factor. in accordance with a determination that the causal event involves the second factor and the outcome event involves the first factor, determining the first causality as that the second factor affects the first factor.

In some embodiments, for an event of the causal event or the outcome event, determining that the event involves the first factor based on determining at least one: that text representing the event comprises words representing the first factor, that text representing the event matches semantically with words representing the first factor.

In some embodiments, the process 800 further comprises additional steps. The computing device 110 may determine at least one reference sentence matching the first causality from text of the text set 105; and determine a target sentence reflecting the first causality based on the at least one reference sentence.

In some embodiments, the computing device 110 may determine at least one reference sentence matching the first causality from text of the text set 105; and determine a causal strength of the first causality based on the number of the at least one reference sentence, the causal strength indicating an influence degree of the first factor on the second factor or an influence degree of the second factor on the first factor.

In some embodiments, the computing device 110 may determine a second causality indicating that a second predefined factor of the target object affects a factor of interest of the target object; and determine, based on the text set, a second target sentence reflecting the second causality.

In some embodiments, the computing device 110 may present an element representing the first factor and an element representing the second factor in association.

In some embodiments, in order to present an element representing the first factor and an element representing the second factor in association, the computing device 110 may present a first node representing the first factor and a second node representing the second factor, and present an edge connecting the first node and the second node.

In some embodiments, the computing device 110 may present, in association with the edge, a target sentence reflecting the first causality.

In some embodiments, a saliency degree of the edge is related to a causal strength of the first causality. The causal strength indicates an influence degree of the first factor on the second factor or an influence degree of the second factor on the first factor.

Example Device

FIG. 9 illustrates a block diagram of a computing device 900 in which one or more embodiments of the present disclosure may be implemented. It is to be understood that the computing device 900 shown in FIG. 9 is only exemplary and should not suggest any limitation to the functionality and scope of the embodiments described herein. The computing device 900 shown in FIG. 9 may be used to implement the computing device 110 of FIG. 1.

As shown in FIG. 9, the computing device 900 is in the form of a universal computing device. The components of computing device 900 may include, but are not limited to, one or more processors or processing units 910, a memory 920, a storage device 930, one or more communication units 940, one or more input devices 950, and one or more output devices 960. The processing unit 910 may be a real or virtual processor and may perform various processes according to programs stored in the memory 920. In a multiprocessor system, a plurality of processing units performs computer executable instructions in parallel to improve the parallel processing capability of computing device 900.

The computing device 900 typically includes a plurality of computer storage media. Such media may be any available media accessible by the computing device 900, including but not limited to volatile and non-volatile media, detachable and non-detachable media. Memory 920 may be volatile memory (such as a register, a cache, a random-access memory (RAM)), a non-volatile memory (such as read-only memory (ROM), electrically erasable programmable read-only memory (EEPROM), flash memory), or some combination thereof. The storage device 930 may be a detachable or non-detachable medium, and may include machine-readable medium, such as a flash drive, a disk, or any other medium that may be used to store information and/or data (e.g., training data for training) and may be accessed within the computing device 900.

The computing device 900 may further include additional detachable/non-detachable, volatile/non-volatile storage media. Although not shown in FIG. 9, there may be provided a disk drive for reading from or writing into a detachable, non-volatile disk (e.g., a "floppy disk") and an optical disk drive for reading from or writing into a detachable, non-volatile disk. In these cases, each driver may be connected to a bus (not shown) via one or more data medium interfaces. Memory 920 may include computer program product 925, which has one or more program modules configured to perform various methods or actions of various embodiments of the present disclosure.

The communication unit 940 implements communication with another computing devices through a communication medium. Additionally, the functions of the components of the computing device 900 may be implemented by a single computing cluster or a plurality of computing machines, which may communicate through communication connections. Therefore, computing device 900 may operate in a networked environment using logical connections to one or more other servers, network personal computers (PCs), or another network node.

Input device 950 may be one or more input devices, for example, a mouse, keyboard, a trackball, etc. The output device 960 may be one or more output devices, for example, a display, a speaker, a printer, etc. The computing device 900 may also communicate with one or more external devices (not shown) through the communication unit 940 as needed, such as storage devices, display devices, etc., to communicate with one or more devices that enable users to interact with the computing device 900, or communicate with any device (e.g., a network card, modem, etc.) that enables the computing device 900 to communicate with one or more other computing devices. Such communication may be performed via an input/output (I/O) interface (not shown).

According to exemplary implementations of the present disclosure, a computer-readable storage medium is provided, on which one or more computer instructions are stored, wherein one or more computer instructions are performed by a processor to implement the method described above.

Various aspects of the present disclosure are described herein with reference to the flowchart and/or block diagram of the method, apparatus (system) and computer program product implemented in accordance with the present disclosure. It is to be understood that each block in the flowchart and/or block diagram, as well as the combination of each block in the flowchart and/or block diagram, may be implemented by computer-readable program instructions.

These computer-readable program instructions may be provided to a processing unit of a general-purpose computer, a specialized computer, or other programmable data processing apparatus to produce a machine, such that the instructions, which perform via the processing unit of the computer or other programmable data processing apparatus, generates means that implement the functions/actions specified in one or more blocks in the flowchart and/or block diagram. These computer-readable program instructions may also be stored in a computer-readable storage medium, which enables a computer, a programmable data processing apparatus, and/or other devices to function in a particular manner, thereby the computer-readable medium having the instructions comprises an article of manufacture including instructions which implement various aspects of the functions/actions specified in one or more blocks of the flowchart and/or block diagram.

These computer-readable program instructions may also be loaded onto a computer, other programmable data processing apparatus, or other devices to perform a series of operational steps on a computer, other programmable data processing apparatus, or other device, in order to generate a computer implementation process, thereby enabling the execution of a series of operational steps on the computer, other programmable data processing apparatus, or other device, the instructions performed on other devices implement the functions/actions specified in one or more blocks of the flowchart and/or block diagram.

The flowchart and block diagram in the figure illustrate a possible architecture, functionality, and operation of possible implementations of systems, methods, and computer program products in accordance with various implementations of the present disclosure. At this point, each block in a flowchart or block diagram may represent a module, program segment, or a portion of instruction, which comprises one or more executable instructions for implementing a specified logical function. In some alternative implementations, the functions indicated in the block may also occur in a different order than those indicated in the figure. For example, two blocks shown in succession may, in fact, be performed substantially concurrently, and sometimes they may also be performed in the reverse order, depending on the functionality involved. It should also be noted that each block of the block diagram and/or flowchart, as well as the combination of blocks in the block diagram and/or flowchart, may be implemented by dedicated hardware-based systems that perform specified functionality or actions, or may be implemented by a combination of dedicated hardware and computer instructions.

The above has already described the various implementations of the present disclosure, and the above illustration is exemplary, not exhaustive, and is not limited to the disclosed implementations. Many modifications and variations are apparent to those of ordinary skill in the art without deviating from the scope and spirit of the described implementations. The selection of terms used herein aims to best explain the principles of implementation, practical applications, or improvements over technology in the market, or to enable other ordinary technical personnel in the field of this technology to understand the various implementations disclosed herein.

The invention claimed is:

1. A method of information processing, comprising:
providing a table indicating responses to an information collection form for a target object, wherein a first row of the table corresponds to responses from a first respondent and a second row of the table corresponds to responses from a second respondent, wherein a plurality of first columns of the table comprise responses to closed-ended questions in the information collection form, wherein the closed-ended questions are respectively associated with a plurality of predefined factors, and wherein a second column of the table comprises responses to an open- ended question in the information collection form;
determining a group of target factors for the target object based on an unstructured text set about the target object, each target factor representing an aspect of the target object, wherein the unstructured text set comprises the responses to the open-ended question in the second column of the table;
determining a causal-outcome event pair comprising a causal event and an outcome event by analyzing text in the unstructured text set; and
determining, based on the causal-outcome event pair, a first causality between a first factor in the group of target factors and a second factor of the target object, wherein the second factor comprises a first predefined factor of the target object from among the plurality of predefined factors.

2. The method according to claim 1, further comprising:
determining at least one reference sentence matching the first causality from text of the unstructured text set; and
determining a target sentence reflecting the first causality based on the at least one reference sentence.

3. The method according to claim 1, further comprising:
determining at least one reference sentence matching the first causality from text of the unstructured text set; and
determining a causal strength of the first causality based on the number of the at least one reference sentence, the causal strength indicating an influence degree of the first factor on the second factor or an influence degree of the second factor on the first factor.

4. The method according to claim 1, further comprising:
determining a second causality indicating that a second predefined factor of the target object affects a factor of interest of the target object; and
determining, based on the unstructured text set, a second target sentence reflecting the second causality.

5. The method according to claim 1, wherein determining the first causality comprises one of the following:
in accordance with a determination that the causal event involves the first factor and the outcome event involves the second factor, determining the first causality as that the first factor affects the second factor,
in accordance with a determination that the causal event involves the second factor and the outcome event involves the first factor, determining the first causality as that the second factor affects the first factor.

6. The method according to claim 5, further comprising: for an event of the causal event or the outcome event, determining that the event involves the first factor based on determining at least one:
that text representing the event comprises words representing the first factor,
that text representing the event matches semantically with words representing the first factor.

7. The method according to claim 1, wherein determining the causal-outcome event pair comprises:
determining, based on text in the unstructured text set, the causal-outcome event pair according to a self-trained natural language processing model.

8. The method according to claim 1, further comprising: presenting an element representing the first factor and an element representing the second factor in association.

9. The method according to claim 8, wherein presenting an element representing the first factor and an element representing the second factor in association comprises:
presenting a first node representing the first factor and a second node representing the second factor; and
presenting an edge connecting the first node and the second node.

10. The method according to claim 9, further comprising: presenting, in association with the edge, a target sentence reflecting the first causality.

11. The method according to claim 9, wherein a saliency degree of the edge is related to a causal strength of the first causality, and the causal strength indicates an influence degree of the first factor on the second factor or an influence degree of the second factor on the first factor.

12. An electronic device, comprising:
at least one processing circuit configured to:
access a table indicating responses to an information collection form for a target object, wherein a first row of the table corresponds to responses from a first respondent and a second row of the table corresponds to responses from a second respondent, wherein a plurality of first columns of the table comprise responses to closed-ended questions in the information collection form, wherein the closed-ended questions are respectively associated with a plurality of pre-defined factors, and wherein a second column of the table comprises responses to an open-ended question in the information collection form;
determine a group of target factors for the target object based on an unstructured text set about the target object, each target factor representing an aspect of the target object, wherein the unstructured text set comprises the responses to the open-ended question in the second column of the table;
determine a causal-outcome event pair comprising a causal event and an outcome event by analyzing text in the unstructured text set; and
determine, based on the causal-outcome event pair, a first causality between a first factor in the group of target factors and a second factor of the target object, wherein the second factor comprises a first predefined factor of the target object from among the plurality of predefined factors.

13. The electronic device according to claim 12, wherein the at least one processing circuit is further configured to:
determine at least one reference sentence matching the first causality from text of the unstructured text set; and
determine a target sentence reflecting the first causality based on the at least one reference sentence.

14. The electronic device according to claim 12, wherein the at least one processing circuit is further configured to:
determine at least one reference sentence matching the first causality from text of the unstructured text set; and
determine a causal strength of the first causality based on the number of the at least one reference sentence, the causal strength indicating an influence degree of the first factor on the second factor or an influence degree of the second factor on the first factor.

15. The electronic device according to claim 12, wherein the at least one processing circuit is further configured to:
determine a second causality indicating that a second predefined factor of the target object affects a factor of interest of the target object; and
determine, based on the unstructured text set, a second target sentence reflecting the second causality.

16. A non-transitory computer-readable storage medium comprising computer programs stored thereon, the computer programs executable by a processor to implement a method of information processing, the method comprising:
providing a table indicating responses to an information collection form for a target object, wherein a first row of the table corresponds to responses from a first respondent and a second row of the table corresponds to responses from a second respondent, wherein a plurality of first columns of the table comprise responses to closed-ended questions in the information collection form, wherein the closed-ended questions are respectively associated with a plurality of pre-defined factors, and wherein a second column of the table comprises responses to an open-ended question in the information collection form;
determining a group of target factors for the target object based on an unstructured text set about the target object, each target factor representing an aspect of the target object, wherein the unstructured text set comprises the responses to the open-ended question in the second column of the table;
determining a causal-outcome event pair comprising a causal event and an outcome event by analyzing text in the unstructured text set; and
determining, based on the causal-outcome event pair, a first causality between a first factor in the group of target factors and a second factor of the target object, wherein the second factor comprises a first predefined factor of the target object from among the plurality of predefined factors.

* * * * *